United States Patent [19]

Halling et al.

[11] Patent Number: 4,919,453
[45] Date of Patent: Apr. 24, 1990

[54] LOW PROFILE V-COUPLING

[75] Inventors: Horace P. Halling; Thomas S. Oh, both of Laurel, Md.

[73] Assignee: EG&G Pressure Science, Inc., Beltsville, Md.

[21] Appl. No.: 371,694

[22] Filed: Jun. 21, 1989

Related U.S. Application Data

[63] Continuation of Ser. No. 62,617, Jun. 16, 1987, abandoned.

[51] Int. Cl.⁵ .............................................. F16L 23/00
[52] U.S. Cl. ........................................ 285/3; 285/367; 285/411; 24/270; 24/279
[58] Field of Search ............... 285/411, 410, 409, 366, 285/367, 365, 407, 408, 3; 24/270, 279, 285, 284, 273

[56] References Cited

U.S. PATENT DOCUMENTS

| | | | |
|---|---|---|---|
| 196,807 | 11/1877 | Jolliffe et al. | 285/409 |
| 627,987 | 7/1899 | Dick | 24/270 |
| 1,514,023 | 11/1924 | Stacy | 24/270 |
| 1,966,039 | 7/1934 | Muchnic | 285/411 |
| 2,688,170 | 9/1954 | Balzer | 285/410 X |
| 2,706,648 | 4/1955 | Gosse | 285/409 |
| 2,752,174 | 6/1956 | Frost | 285/409 |
| 2,996,316 | 8/1961 | Terhune | 285/411 X |
| 3,458,217 | 7/1969 | Pride, Jr. et al. | 285/410 X |
| 3,575,432 | 4/1971 | Taylor | 277/206 R |
| 3,600,770 | 8/1971 | Halling | 285/411 |
| 3,797,836 | 3/1974 | Halling | 277/200 |
| 3,828,403 | 8/1974 | Perrin et al. | 285/365 X |
| 4,123,095 | 10/1978 | Stehlin | 285/411 X |
| 4,341,406 | 7/1982 | Abbes et al. | 285/408 |

FOREIGN PATENT DOCUMENTS

| | | | |
|---|---|---|---|
| 319534 | 3/1920 | Fed. Rep. of Germany | 285/366 |
| 1403430 | 5/1965 | France . | |
| 307327 | 12/1968 | Sweden | 285/410 |
| 29358 | of 1909 | United Kingdom | 285/411 |
| 339065 | 12/1930 | United Kingdom | 24/279 |
| 638761 | 6/1950 | United Kingdom | 285/411 |
| 1019322 | 2/1966 | United Kingdom | 285/367 |
| 1126872 | 9/1968 | United Kingdom . | |
| 1140636 | 1/1969 | United Kingdom . | |

OTHER PUBLICATIONS

"Assembly Instructions" for a pipe coupling, 1970's, Aeroquip.

Primary Examiner—Thomas F. Callaghan
Attorney, Agent, or Firm—Roylance, Abrams, Berdo & Goodman

[57] ABSTRACT

A device for coupling the peripheral flanges of a pair of pipes comprising a pair of retaining members, each having a V-shaped groove for receiving a portion of the peripheral flanges of the pipes. The retaining members are pivotally coupled at one of their ends by a single hinge and releasably coupled at their opposite ends by an over-center latch mechanism. The over-center latch mechanism employs a compression bolt and nut to maintain a low profile. The over-center latch mechanism also has primary and secondary link members, the latter preventing the coupling from completely separating should the primary link members fail.

25 Claims, 2 Drawing Sheets

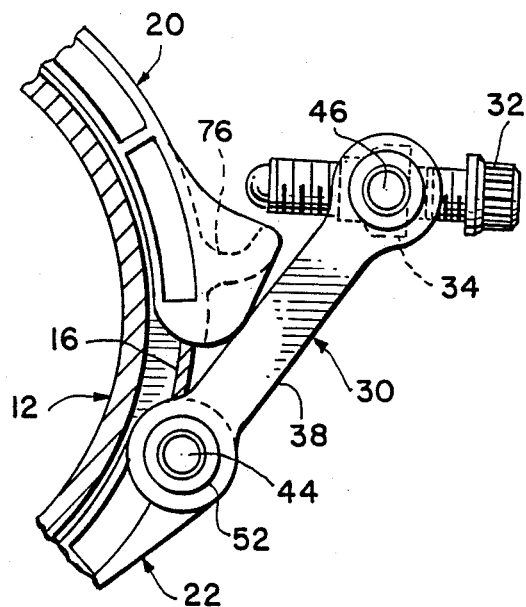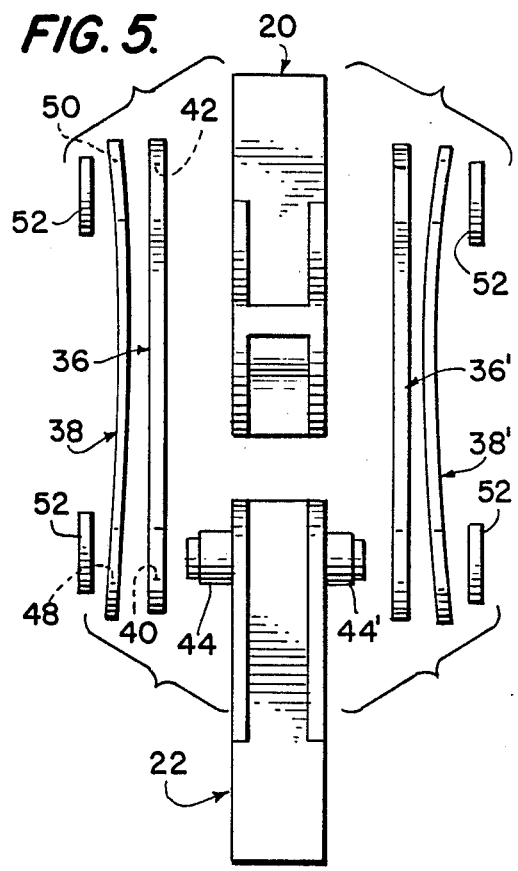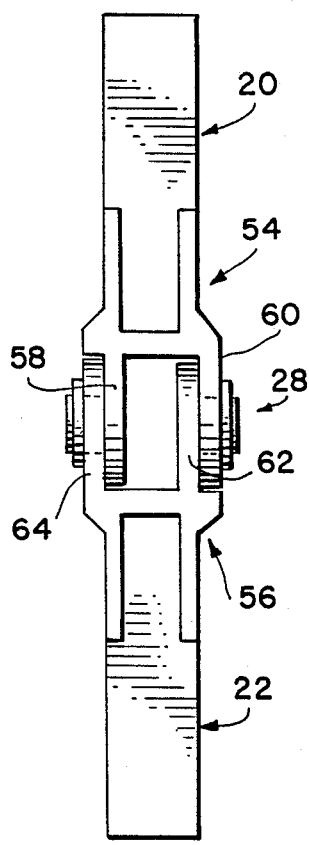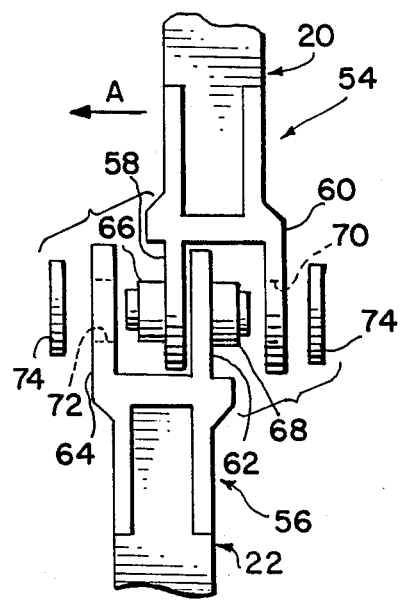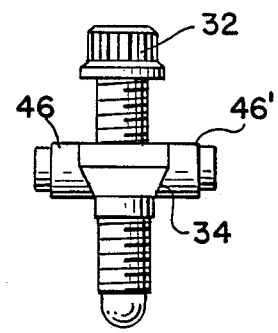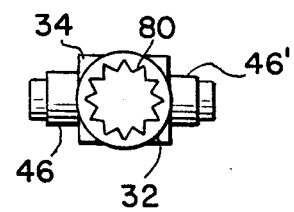

LOW PROFILE V-COUPLING

This is a continuation of application Ser. No. 07/062,617 filed Jun. 16, 1987.

FIELD OF THE INVENTION

The invention relates to a low profile coupling device for coupling the flange of one pipe to the flange of another pipe. More specifically, the invention relates to a coupling device which may be installed in areas of limited space. The device includes two arcuate retaining members, which are pivotally coupled at one of their adjacent ends and releasably coupled at their adjacent opposite ends. The retaining members are releasably coupled by an over-center latch mechanism having a low profile.

BACKGROUND OF THE INVENTION

Circular, V-couplings for clamping the flanges of pipes together have been used for many years, especially in pipes conducting high temperature and pressure fluids. While these couplings provide adequate clamping, they are consistently large, heavy and bulky. Thus, substantial space is required for their installation. In many situations, weight is a premium, such as in aircraft and aerospace equipment; therefore, the size of the clamp must be minimized to decrease costs. Reduction of the size and weight of the V-couplings and flanges has until now engendered a further problem of flanges being forced into non-circular deformation during tightening of the coupling. Non-circularity sometimes contributes to stiffening of the resistance to actuation of lightweight valves and other components connected to ducting by V-couplings.

There are two basic categories of pipe couplings used today. The first coupling is fabricated from sheet metal retainers attached to tension bands. They were at first in widespread use in the aircraft and aerospace industries; however, their reliability was very questionable, owing to failures of their riveted or spot welded joints and fatigue failures of their tension bands.

The second type of coupling was later introduced, using forged, cast or machined retainers, with integrally hinged ends joined by eyebolt fasteners and connecting links. While the "forged-style" couplings have proven extremely reliable and efficient, they suffer from two disadvantages, which are addressed by the present invention. First, current "forged-style" couplings use tension-type swing-bolts and links that are disposed at a considerable offset distance from the neutral axis of the coupling retainer channel section. The resultant movement produced by the fastener tightening torque causes inward rotation of the retainer ends which, in turn, locally deflects the flanges inward. Opposite the fastener, the two retainers are joined by a non-adjustable swivel link, which is offset from the circumferential loading line between the two retainers. This offset arrangement in this type of coupling is essential to the proper functioning of the coupling so that tension is transmitted through the linked retainer ends entirely symmetrically. Accordingly, the same amount of inward deflection occurring at the fastener ends of the retaining member is also produced at the hinged ends of the retaining member.

Second, current couplings employ a tension bolt, which by its nature is the component most prone to failure by fatigue and/or by overtightening. Because of the relatively long movement required for adjustment of a fastener element, any automatic safety element protecting it must have means for accommodating this long movement, such as a slotted hole. The presence of a long slot results in a large movement if the primary structure fails, before the safety element engages. This large movement results in a loosening of the coupling and separation of the flanges causing substantial leakage.

Examples of these couplings are disclosed in U.S. Pat. Nos. 1,966,039 to Muchnic; 3,575,432 to Taylor; and 3,797,836 to Halling; French Pat. No. 1,403,430 to Avica Equipment Ltd.; and British Pat. Nos. 1,126,872 to Ward et al. and 1,140,636 to Brownhill et al.

SUMMARY OF THE INVENTION

Accordingly, a primary object of the invention is to provide a V-coupling that requires minimal space for installation and that is relatively light in weight, easy to assemble, reliable, and relatively simple to make.

Another object of the invention is to provide a V-coupling that reduces the amount of offset in the circumferential loading line of the latch and the hinge.

Another object of the invention is to provide a V-coupling that limits the amount of loosening of the retaining members around the pipe should a primary link fail.

The foregoing objects are basically attained by providing a device for coupling the peripheral flanges of a pair of pipes, comprising: first and second arcuate retaining members, each having a first end, a second end, and an inner surface including a groove extending between the first and second ends and adapted to receive a portion of the peripheral flanges of the pipes; a single hinge for pivotally coupling the retaining means; and an over-center latch mechanism including two pair of links, which overlie a portion of and are substantially tangential to the peripheral flanges, and a substantially tangentially-oriented compression bolt engaging a cup-shaped hook or stop in one of the retaining members for tightly coupling the device around the peripheral flanges of the pipes.

Other objects, advantages and salient features of the invention will become apparent from the following detailed description, which, taken in conjunction with the annexed drawings, discloses a preferred embodiment of the invention.

DRAWINGS

Referring now to the drawings which form part of this original disclosure:

FIG. 4 is a side elevational view in partial section taken through the pipes, showing the over-center latch mechanism in its unlatched position;

FIG. 5 is an exploded front elevational view of the over-center latch mechanism with the compression bolt and trunnion nut removed;

FIG. 6 is a rear elevational view of the coupling in accordance with the invention showing the single hinge;

FIG. 7 is an exploded view of the hinge shown in FIG. 6;

FIG. 8 is a front elevational view of the compression bolt and trunnion nut; and FIG. 9 is a top elevational view of the compression bolt and trunnion nut shown in FIG. 8.

DETAILED DESCRIPTION OF THE INVENTION

Figure 1:
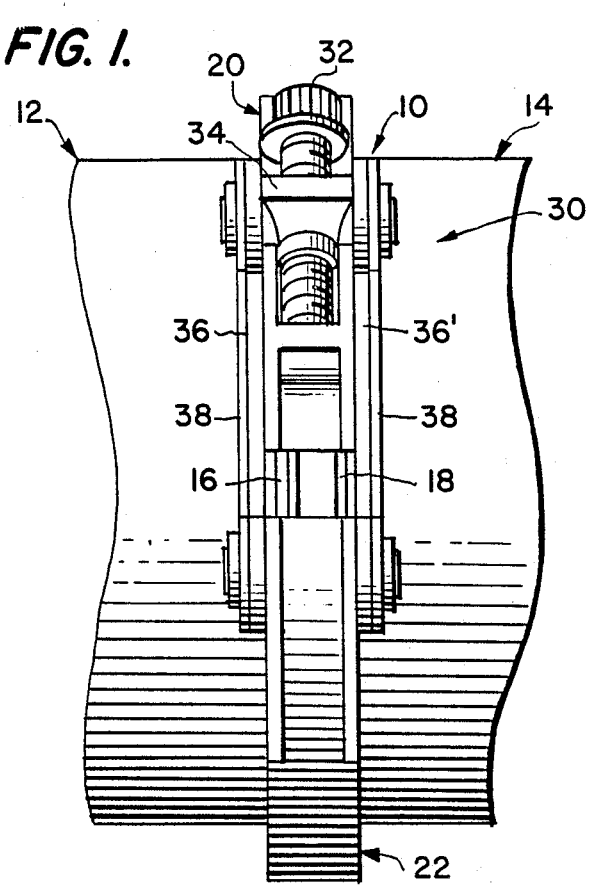
FIG. 1 is a front elevational view of the coupling in accordance with the invention coupled about the peripheral flanges of a pair of pipes.
Figure 2:
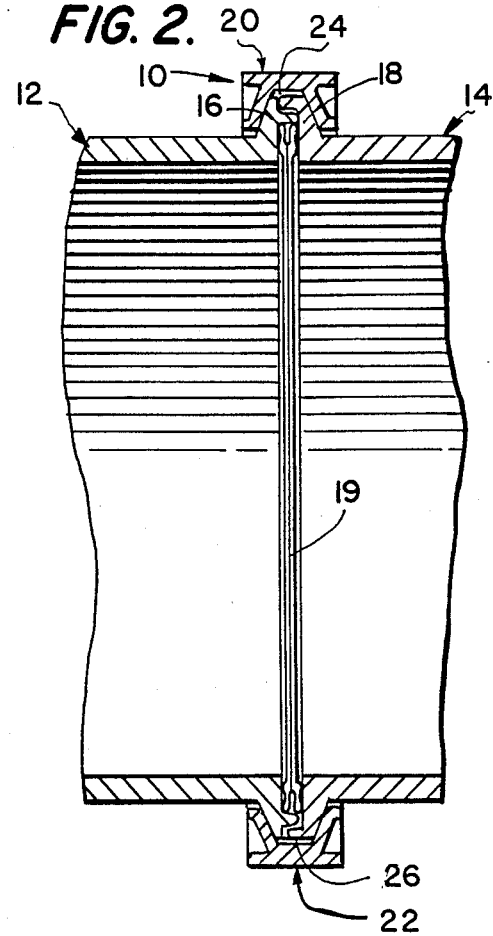
FIG. 2 is a longitudinal sectional view of the coupling shown in FIG. 1, which also shows the peripheral flanges of the pair of pipes.
Figure 3:
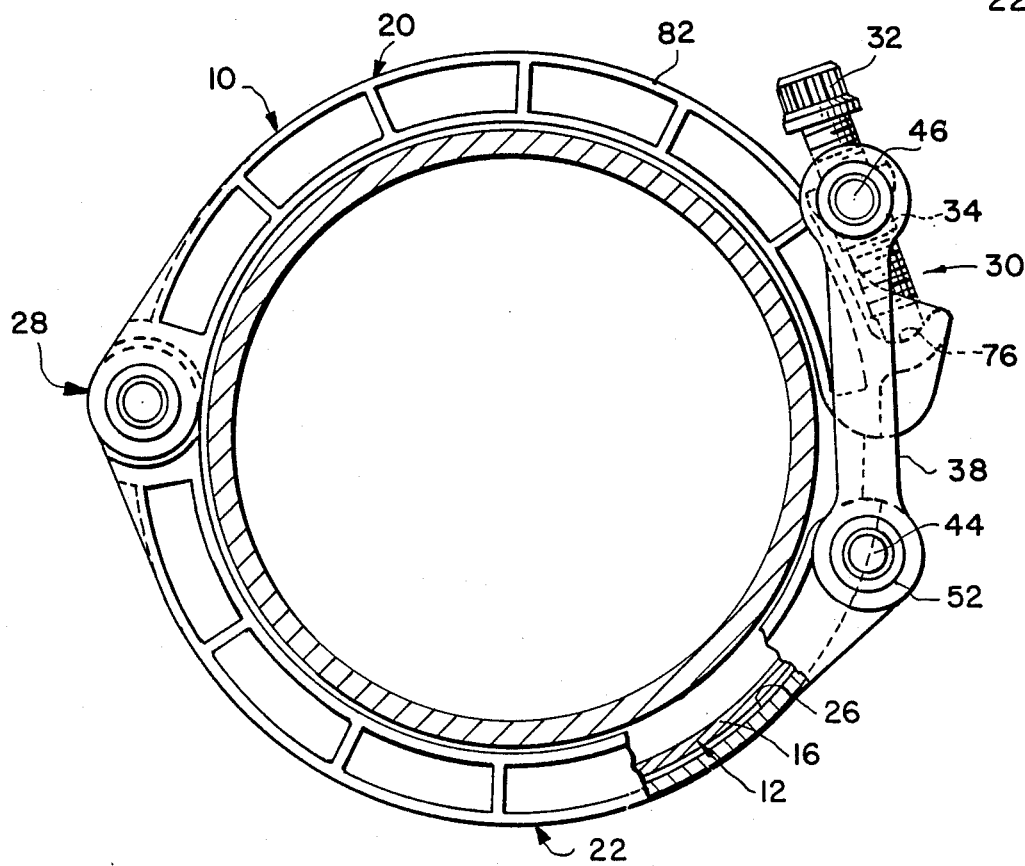
FIG. 3 is a side elevational view in section taken through the pipes, showing the coupling in accordance with the invention with a portion of one of the retaining members broken away.

Referring now to FIGS. 1, 2, and 3, the V-coupling device 10, in accordance with the invention, connects and couples first and second coaxial pipes 12 and 14, having a first peripheral, tapered flange 16 coupled to the first pipe 12 and a second peripheral, tapered flange 18 coupled to the second pipe 14, the flanges likewise being coaxial and in abutment, with an E-shaped seal 19 positioned therebetween. The coupling device 10 comprises first and second arcuate retaining and substantially semicircular members 20 and 22, each having on its inner circumferential surface a V-shaped groove 24 and 26, respectively, for receiving the peripheral flanges 16 and 18. The first and second arcuate retaining members 20 and 22 are pivotally connected by a single hinge 28 at one of their adjacent ends and releasably coupled at their other adjacent ends by an over-center latch mechanism 30. The over-center latch mechanism 30 comprises a compression bolt 32, a trunnion nut 34 threadedly mounted thereon, primary link members 36 and 36', and secondary link members 38 and 38' for tightly coupling the retaining members 20 and 22 about the peripheral flanges 14 and 16.

Referring now to FIG. 4, the over-center latch mechanism 30 is shown in its unlatched position with compression bolt 32 threadedly received in nut 34. The overcenter arrangement improves latch security in the event that the compression bolt 32 is not completely tightened or should the primary link members 36 and 36' fail. It also provides leverage for drawing together seperated flanges. Accidental unlatching of the over-center latch mechanism 30 is resisted since the coupling device 10 actually must tighten around the flanges before the latch mechanism can become unlatched, as seen in FIGS. 3 and 4.

The over-center latch mechanism 30 employs compression bolt 32, which minimizes the possibility of fastener fatigue failure. This enables the over-center latch mechanism 30 to use a lighter nut and bolt, than can be used on a tension bolt coupling. Also, the length of the bolt is minimized by employing compression bolt 32 with the over-center latch mechanism 30.

Referring now to FIGS. 1 and 5, the over-center latch mechanism 30 is designed so that the primary link members 36 and 36' are the weakest link in the coupling device 10. The primary link members are in tension during normal use, while the secondary link members 38 and 38' are unloaded. The primary link members are pivotally coupled to the end of retaining member 22 and the trunnion nut 34. Each primary link member has circular openings 40 and 42 at opposite ends which pivotally receive cylindrical pivot pins 44 and 44' rigidly coupled to retaining member 22 and cylindrical pivot pins 46 and 46' rigidly coupled to trannion nut 34, respectively. The pivot pins 44 and 44' have substantially a portion of their diameters overlying a portion of the peripheral flanges to minimize the radial extent of the over-center latch mechanism. Pivot pins 44, 44' and 46, 46 may be integrally formed with the second arcuate retaining member 22 and the trunnion nut 34, respectively. Each secondary link member 38 and 38' has circular openings 48 and 50 at opposite ends, which also pivotally receive pivot pins 44 and 44' on retaining member 22 and pivot pins 46 and 46' on trunnion nut 34, respectively. The secondary link members are parallel to one another and are parallel to and overlie the primary link members, but their openings 48 and 50 are larger than openings 40 and 42 of the primary link members. The secondary link members, therefore, can only be loaded in tension if the primary link members fail due, for example, to plastic deformation, cracking or rupturing. The primary and secondary link members 36, 36' and 38, 38' are retained upon the pivot pins 44, 44' and 46, 46' by ball-peening hollow ends of the pins into a countersink (not shown) in retaining washers 52. The secondary link members are outwardly bowed when unassembled, as seen in FIG. 5, to ensure that they fit snugly against the primary link members when assembled, to thereby dampen vibrations. As seen in FIGS. 1 and 3-5, the primary and secondary link members have the same length and outer configuration.

The coupling device 10 can be easily inspected to determine if the primary link members 36, 36' have failed by gripping the secondary link members 38, 38' and seeing if they are still free to slide after the coupling is tightened.

Referring now to FIGS. 3, 6 and 7, a single hinge 28 pivotally coupling the retaining member 20 and 22 is positioned exceptionally close to the peripheral flanges 14 and 16, as best seen in FIG. 3. The single hinge 28 comprises a first fork member 54 extending from retaining member 20 and a second fork member 56 extending from retaining member 22. Each fork member 54 and 56 comprises at least two prongs 58, 60 and 62, 64, respectively. Prongs 58 and 62 have coaxial, but oppositely directed, cylindrical hinge pins 66 and 68 extending therefrom, respectively, while prongs 60 and 64 have coaxial, circular openings 70 and 72 therethrough. The hinge pins 66 and 68 are advantageously cast integrally with prongs 58 and 62. Assembly is achieved by offsetting the center lines of the two retaining members 20 and 22, inserting one fork member into the other, and then employing a relative transverse movement indicated by arrow A to engage pins 66 and 68 in the openings 70 and 72, as shown in FIG. 7. The pins 66 and 68 are pivotally retained in openings 70 and 72 by ballpeening hollow ends of the pins 66 and 68 into countersinks (not shown) in retaining washers 74.

As seen in FIGS. 3-5, a curved, radially outwardly extending cup-shaped hook or stop 76 is rigidly coupled at an end of the first retaining member 20 for the reception of the end of compression bolt 32. By making the link members long enough to locate trunnion nut 34 above the cup-shaped hook or stop 76 as seen in FIGS. 1, 3, and 4, the over-center mechanism is formed.

Referring now to FIGS. 8 and 9, the compression bolt 32 and trunnion nut 34 are shown with the remaining parts of the over-center latch mechanism 30 removed. As illustrated in FIG. 9, the compression bolt 32 can be rotatably and thus longitudinally adjusted relative to the nut by using a tool, such as a socket wrench, which engages the twelve-point star-shaped spline 80 formed at the head of the bolt.

In operation, the first arcuate retaining member 20 and the second arcuate retaining member 22 are placed about the abutting peripheral flanges 16 and 18 of pipes 12 and 14, so that a portion of the peripheral flanges 16 and 18 are received in the grooves 24 and 26 of the retaining members 20 and 22. Next, the over-center latch mechanism 30 is pivoted on pins 44, 44' so that the primary and secondary link members 36, 36' and 38, 38' overlie the sides of the peripheral flanges 16 and 18 extending between the ends of the retaining members 20 and 22, and overlie the sides of the end of retaining member 20 as seen in FIG. 3. The compression bolt 32 is likewise pivoted about pins 46, 46' and is then tightened into the cup-shaped hook or stop 76 in the end of retaining member 20 so as to be arranged in an over-center manner. In this position, bolt 34 extends substantially tangentially relative to the retaining members, as do the primary and secondary link members as seen in FIG. 3. In the coupled position as seen in FIG. 3, the primary link 36 has its load line extending between pivot pins 44 and 46 and its load line oriented substantially tangentially to the peripheral flanges 16 and 18 of the pipes 12 and 14. The primary link 36' also has its load line extending between pivot pins 44' and 46' and its load line oriented substantially tangentially to the peripheral flanges 16 and 18 of the pipes 12 and 14.

This arrangement of an over-center latch mechanism 30 having a tangentially-oriented compression bolt 32 provides a low profile coupling having virtually no offset of the circumferential loading line of latch mechanism 30 from the retaining members 20 and 22. The coupling device 10 therefore produces substantially less out-of-rounding of the peripheral flanges 16 and 18 and has a minimum radial envelop. Due to the former advantage, there is no need to scale the tightening torque according to the size of the pipes and the coupling device. This saves installation time and avoids errors due to inappropriate torque wrench settings.

The tangential orientation of the load line of the compression bolt 32 is important. Since it is directed away from the center of the coupling it compensates for the tendency of the stop 76 to rotate inwardly.

The envelope radius of the present invention, measured between the compression bolt 32 and the center of the coupling device 10, is considerably less than that of the prior art. For example, in the case of the two inch size pipe coupling there is 0.28 inch reduction in the envelope radius and in a four inch size pipe coupling there is a 0.19 inch reduction.

EXAMPLES

| Nominal Diameter of Pipes (Inches) | A | B | C | D | A/B | C/R | D/R |
|---|---|---|---|---|---|---|---|
| 1 | 1.58 | .88 | 1.08 | .38 | 1.80 | 2.160 | .760 |
| 2 | 2.05 | 1.38 | 1.05 | .38 | 1.49 | 1.050 | .380 |
| 3 | 2.55 | 1.88 | 1.05 | .38 | 1.36 | .700 | .253 |
| 4 | 3.03 | 2.38 | 1.03 | .38 | 1.27 | .515 | .190 |
| 5 | 3.53 | 2.88 | 1.03 | .38 | 1.23 | .412 | .152 |
| 6 | 4.00 | 3.38 | 1.00 | .38 | 1.18 | .333 | .127 |
| 7 | 4.49 | 3.88 | .99 | .38 | 1.16 | .283 | .109 |
| 8 | 4.98 | 4.38 | .98 | .38 | 1.14 | .245 | .095 |

A = distance from center of coupling to the outer radial extent of the coupling (envelope radius)
B = distance from center of coupling to the outer circumferential surface of the retaining members
C = distance from the outer diameter of the pipes to the outer radial extent of the coupling
D = distance from the periphery of the pipes to the outer circumferential surface of the retaining member
R = radius of the pipes The above examples of various pipe diameters illustrate the low profile of the coupling. In particular, the ratio A/B of the envelope radius of the coupling to the radius of the outer circumferential surface 82 of the coupling illustrates the relatively minimal distance the latch mechanism 30 extends outwardly from the coupling device by employing the present invention. The ratio C/R illustrates the overall increase in the size of the coupling relative to the radius of the pipes. The ratio D/R illustrates the amount of increase in the size of the coupling, due to retaining members 20 and 22, relative to the radius of the pipe.

While only a few pipe diameters are illustrated in the above examples, it will be understood that the present invention may be employed over all sizes of flanged pipes regardless of axial and/or radial dimensions.

Various suitable materials may be used to make the coupling, for example, INCONEL 713 LC for the retaining members 20 and 22, ALLOY A-286 for the compression bolt 32 and trunnion nut 34, INCONEL 718 for the primary and secondary links 36, 36' and 38, 38', and stainless steel 303, 304 for the retaining washers 52 and 74.

While only one embodiment has been chosen to illustrate the invention, it will be understood by those skilled in the art that various changes and modifications can be made therein without departing from the scope of the invention as defined in the appended claims.

What Is Claimed Is:

1. A device for coupling the peripheral flanges of a pair of pipes, the combination comprising:
    first and second arcuate retaining means, each of said arcuate retaining means having a first end, a second end, and an inner surface, said inner surface including a groove extending between said first and second ends and adapted to receive a portion of the peripheral flanges of the pipes;
    means, coupled to said first ends of said first and second arcuate retaining means, for pivotally coupling said first ends together; and
    means, coupled to said second ends of said first and second arcuate retaining means, for coupling said second ends together and for radially inwardly moving said first and second arcuate retaining means into intimate contact with the peripheral flanges of the pipes;
    said means for coupling and moving comprising an over-center coupling mechanism having a compression bolt for tightening said first and second retaining means about the peripheral flanges of the pipes,
    said means for coupling and moving including a primary link having opposite ends, one end being pivotally coupled to said second end of one of said retaining means and the other end being pivotally coupled to said compression bolt so that, when said coupling device is tightly secured to the flanges of the pipes, said primary link overlies a portion of the flanges of the pipes, thereby minimizing the radial size of said coupling device.

2. A device for coupling according to claim 1, wherein
    each of said opposite ends of said secondary link have an opening through which a pin passes for pivotally coupling said opposite ends of said secondary link to said second end of one of said retaining means and to said compression bolt, said openings being sized to allow said primary link to fail a predetermined amount and thereafter to prevent said coupling device from further loosening.

3. A device for coupling according to claim 1, wherein said means for pivotally coupling includes said first ends of said first and second retaining means, each having a fork member, each of said fork members being offset from the centering line of said first and second retaining means.

4. A device for coupling according to claim 3, wherein each of said fork members includes two prongs, one of said prongs having an opening therethrough and the other of said prongs having a pin extending perpendicular thereto, each of said pins extending through one of said openings in the opposing fork member.

5. A device for coupling according to claim 1, wherein one of said second ends of said arcuate members has a pair of pins extending parallel to the pair of pipes, with a portion of said pins overlying a portion of said flanges to minimize the radial extent of the coupling, said pins pivotally coupling said over-center coupling mechanism to said one of said second ends of said arcuate members.

6. A device for coupling according to claim 1, wherein said compression bolt is generally tangentially oriented to the peripheral flanges of the pair of pipes.

7. A device for coupling the peripheral end flanges of a pair of pipes, comprising:

arcuate retaining means having an inner circumferential groove for circumscribing the flanges of the pipes, said retaining means having first and second ends; and means for tightly coupling said first end to said second end, said means for tightly coupling comprising a primary link having opposite ends, one end being pivotally coupled to said first end of said retaining means;

a compression bolt engaging said second end of said retaining means;

a nut pivotally secured to the other end of said primary link and adjustably retained on said compression bolt for tightening said retaining means around the flanges of the pipes; and a secondary link having opposite ends, and means for pivotally coupling one of said secondary link opposite ends to said first end of said retaining means and for pivotally coupling the other of said secondary link opposite ends to said nut, so that, when said primary link is in tension, said secondary link is unloaded, but when said primary link fails, said secondary link becomes tensioned and limits the amount of loosening of said retaining means around the flanges of the pipes, said secondary link overlying said primary link.

8. A device for coupling according to claim 7, wherein said means for pivotally coupling one of said secondary link opposite ends and for pivotally coupling the other of said secondary link opposite ends includes a first opening at one of said opposite ends,
a second opening at the other of said opposite ends,
a first pin pivotally received in said first opening and having a diameter smaller than said first opening,
a second pin pivotally received in said second opening and having a diameter smaller than said second opening.

9. A device for coupling according to claim 7, wherein said primary and secondary links overlie a portion of the peripheral flanges of the pipes so that the radius of said coupling device is minimized.

10. A device for coupling according to claim 7, wherein said compression bolt engages a stop on said second end of said retaining means and is positioned so as to form an over-center coupling means.

11. A device for coupling according to claim 7, wherein said nut is a trunnion nut having a pair of rigidly coupled pins extending parallel to the pair of pipes for pivotally coupling said primary and secondary links.

12. A device for coupling the peripheral end flanges of a pair of pipes, comprising:

arcuate retaining means having an inner circumferential groove for circumscribing the flanges of the pipes, said retaining means having first and second ends; and means for tightly coupling said first end to said second end, said means for coupling comprising a primary link having opposite ends, one end being pivotally coupled to said first end of said retaining means;

a compression bolt engaging said second end of said retaining means;

a nut pivotally secured to the other end of said primary link and adjustably retained on said compression bolt for tightening said retaining means around the flanges of the pipes; and a secondary link having opposite ends, one end being pivotally coupled to said first end of said retaining means and the other end being pivotally coupled to said nut, and when said primary link is in tension, said secondary link is unloaded, but when said primary link fails, said secondary link becomes tensioned and limits the amount of loosening of said retaining means around the flanges of the pipes, said primary link including a pair of link members, each having opposite ends with an opening through which a pin passes for pivotally coupling said link members to said first end of said retaining means and to said nut; and said secondary link includes a pair of link members, each having opposite ends with an opening therethrough, said secondary link members overlying said primary link members, with said pins being received in said openings of said secondary link members.

said means for coupling and moving further including a secondary link having opposite ends, one end being pivotally coupled to said second end of one of said retaining means and the other end being pivotally coupled to said compression bolt so as to overlie said primary link, and when said primary link is in tension, said secondary link is unloaded, but when said primary link fails, said secondary link becomes tensioned and limits the amount of loosening of said first and second retaining means around the flanges of the pipes.

13. A device for coupling according to claim 12, wherein
said openings of said secondary link members are sized to allow said primary link members to fail a predetermined amount and thereafter to prevent said coupling device from further loosening.

14. A device for coupling according to claim 12, wherein
said link members of said primary and secondary links overlie a portion of the peripheral flanges of said pipes so that the radius of said coupling device is minimized.

15. A low profile coupling for axially joining end flanges of a pair of pipes, comprising:
arcuate retaining means having an inner circumferential groove for circumscribing the flanges of the pipes, said retaining means having a first end, a second end, and an outer circumferential surface; and
means for tightly coupling said first end to said second end,
said means for tightly coupling comprising a primary link coupled at one end to one end of said arcuate retaining means and coupled at its other end to a nut and a bolt, said primary link overlying a portion of the peripheral flanges of the pipes when said arcuate retaining means is tightly coupled around the pipes so that the distance from the center of the pipes to the outer radial extent of said means for coupling is minimized,
said means for coupling further including a secondary link that overlies said primary link so that when said primary link fails, said secondary link becomes tensioned and limits the amount of loosening of said retaining means around the flanges of the pipes.

16. A low profile coupling according to claim 15, wherein
the distance from the center of the pipe to said outer radial extent of said coupling means and the distance from the center of the pipe to said outer circumferential surface of said retaining means has a ratio ranging from 1.80 for one inch diameter pipe to 1.18 for six inch diameter pipe.

17. A low profile coupling according to claim 15, wherein
said primary link comprises a pair of link members which overlie a portion of the peripheral flanges of the pipe so that the peripheral flanges are positioned between said link members when tightly coupled around the pipes.

18. A low profile coupling according to claim 15, wherein
said retaining means further comprises a first retaining member, a second retaining member, and means for pivoting said first and second retaining members relative to one another; said means for pivoting including a fork member extending from each of said retaining members, said fork members being offset from the center line of said retaining members.

19. A low profile coupling according to claim 18, wherein
each of said fork members includes two prongs, one of said prongs having an opening therethrough and the other of said prongs having a pin extending perpendicular thereto, each of said pins extending through one of said openings in the opposing fork member.

20. A low profile coupling according to claim 15, wherein
said means for coupling is an over-center coupling means having said bolt arranged in compression and engaging a stop in said retaining means.

21. A low-profile coupling for axially joining end flanges of a pair of pipes, comprising:
arcuate retaining means having an inner circumferential groove for circumscribing the flanges of the pipes, a first end and a second end; and
means for tightly and releasably coupling said first and second ends of said arcuate retaining means comprising
an over-center coupling mechanism having a compression bolt with its load line oriented substantially tangentially to the flanges of the pipes for tightening said arcuate retaining means about the flanges of the pipes,
a primary link having first and second ends,
first means for pivotally coupling said first end of said primary link to said first end of said arcuate retaining means,
said first means overlying a portion of said end flanges, and
second means for pivotally coupling said second end of said primary link to said compression bolt,
said primary link having a load line extending between said first and second means,
whereby, when said arcuate retaining means is tightly coupled about the flanges of the pipes, said load line of said primary link is oriented substantially tangentially to the flanges of the pipes.

22. A device for coupling the peripheral flanges of a pair of pipes, the combination comprising:
first and second arcuate retaining means, each of said arcuate retaining means having a first end, a second end, and an inner surface, said inner surface including a groove extending between said first and second ends and adapted to receive a portion of the peripheral flanges of the pipes;
means, coupled to said first ends of said first and second arcuate retaining means, for pivotally coupling said first ends together; and
means, coupled to said second ends of said first and second arcuate retaining means, for coupling said second ends together and for radially inwardly moving said first and second arcuate retaining means into intimate contact with the peripheral flanges of the pipes;
said means for coupling and moving comprising
an over-center coupling mechanism having a compression bolt with its load line oriented substantially tangentially to the peripheral flanges of the pipes for tightening said first and second retaining means about the peripheral flanges of the pipes, and
a primary link having first means for pivotally coupling a first end of said primary link to said second end of said first arcuate retaining means and second means for pivotally coupling a second end of said primary link to said compression bolt, said primary link having a load line extending between said first and second means for pivotally coupling, whereby, when said first and second arcuate retaining means are tightly coupled about the peripheral flanges of the pipes, said load line of said primary link is oriented substantially tangentially to the peripheral flanges of the pipes.

23. A device for coupling according to claim 22, wherein
said primary link overlies a portion of the flanges of the pipes, thereby minimizing the radial size of said coupling device.

24. A device for coupling according to claim 23, wherein
said means for coupling and moving further includes a secondary link having opposite ends, one end being pivotally coupled to said second end of one of said retaining means and the other end being pivotally coupled to said compression bolt so as to overlie said primary link, and when said primary link is in tension, said secondary link is unloaded, but when said primary link fails, said secondary link becomes tensioned and limits the amount of loosening of said first and second retaining means around the flanges of the pipes.

25. A device for coupling according to claim 24, wherein
each of said opposite ends of said secondary link has an opening through which a pin passes for pivotally coupling said opposite ends of said secondary link to said second end of one of said retaining means and to said compression bolt, said openings being sized to allow said primary link to fail a predetermined amount and thereafter to prevent said coupling device from further loosening.

* * * * *